United States Patent
Matsukawa

(10) Patent No.: US 8,995,258 B2
(45) Date of Patent: Mar. 31, 2015

(54) RADIO COMMUNICATION APPARATUS AND RADIO COMMUNICATION METHOD FOR DETERMINING RELAY PROCESSING BASED UPON POLICY INFORMATION

(75) Inventor: Koichi Matsukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 353 days.

(21) Appl. No.: 13/520,351

(22) PCT Filed: Jan. 6, 2010

(86) PCT No.: PCT/JP2010/050060
§ 371 (c)(1),
(2), (4) Date: Jul. 3, 2012

(87) PCT Pub. No.: WO2011/083570
PCT Pub. Date: Jul. 14, 2011

(65) Prior Publication Data
US 2012/0275383 A1 Nov. 1, 2012

(51) Int. Cl.
*H04L 12/20* (2006.01)
*H04L 29/08* (2006.01)
(Continued)

(52) U.S. Cl.
CPC ......... *H04L 29/08954* (2013.01); *H04W 72/10* (2013.01); *H04W 84/005* (2013.01)
USPC .......................................................... 370/230

(58) Field of Classification Search
CPC . H04L 29/08954; H04L 47/70; H04W 72/10; H04W 84/005
See application file for complete search history.

(56) References Cited

U.S. PATENT DOCUMENTS 5,687,167 A * 11/1997 Bertin et al. .................. 370/254
6,222,841 B1 * 4/2001 Taniguchi ..................... 370/389
(Continued)

FOREIGN PATENT DOCUMENTS

CN 1887018 A 12/2006
CN 101374304 A 2/2009
(Continued)

OTHER PUBLICATIONS

Japanese Office Action issued Dec. 25, 2012 in Patent Application No. 2011-548884 with English Translation.
(Continued)

*Primary Examiner* — Benjamin Lamont
(74) *Attorney, Agent, or Firm* — Oblon, McClelland, Maier & Neustadt, L.L.P.

(57) ABSTRACT

A radio communication apparatus mounted on a mobile body establishes a local network using terminals and relays a packet transmitted and received between a predetermined terminal connected to the local network and a server connected to an external network, which is another network. The radio communication apparatus includes an uplink-traffic monitoring unit and a downlink-traffic monitoring unit to extract header information from packets received from the server and the terminal, a policy table that registers policy information indicating possibility of communication connection establishment for each combination of the server and the terminal and a priority degree of the communication connection, a priority-degree determining unit to determine whether relay processing for the packet is performed, and an uplink-traffic control unit and a downlink-traffic control unit to discard the received packet when the priority-degree determining unit determines that the relay processing is not performed.

10 Claims, 12 Drawing Sheets

(51) Int. Cl.
*H04W 72/10* (2009.01)
*H04W 84/00* (2009.01)

(56) References Cited

U.S. PATENT DOCUMENTS

| | | | |
|---|---|---|---|
| 2004/0259545 | A1 | 12/2004 | Morita |
| 2006/0092857 | A1* | 5/2006 | Ansari et al. ............ 370/254 |
| 2007/0177598 | A1* | 8/2007 | Miyazaki et al. ......... 370/392 |
| 2008/0215723 | A1 | 9/2008 | Takeshima et al. |
| 2009/0067328 | A1 | 3/2009 | Morris et al. |
| 2009/0222821 | A1* | 9/2009 | Fromm et al. ............ 718/101 |

FOREIGN PATENT DOCUMENTS

| | | |
|---|---|---|
| JP | 2000 316188 | 11/2000 |
| JP | 2001 78260 | 3/2001 |
| JP | 2005 26763 | 1/2005 |
| JP | 2006 93818 | 4/2006 |
| JP | 2009 88755 | 4/2009 |
| JP | 2009 206641 | 9/2009 |

OTHER PUBLICATIONS

Office Action issued on Nov. 27, 2013 in the corresponding German Patent Application No. 11 2010 005 088.0 (with English Translation).
"Tranmission Control Protocol," DARPA Internet Program, total 119 pages, (Sep. 1981).
Second Edition, "Difference between SPI and Dynamic Packet Filtering," total 14 pages, (May 16, 2003), URL: http://plusd.itmedia.co.jp/broadband/0305/16/Ip13.html (with English translation).
International Search Report Issued Feb. 16, 2010 in PCT/JP10/50060 Filed Jan. 6, 2010.
Office Action issued on Jul. 22, 2014 in the corresponding Chinese Patent Application No. 201080060643.5 (with partial English translation).

* cited by examiner

FIG.3

| SERVER | | TERMINAL | | TCP CONNECTION ESTABLISHMENT POSSIBILITY | DIRECTION | PRIORITY DEGREE |
|---|---|---|---|---|---|---|
| IP ADDRESS | PORT NUMBER | IP ADDRESS | PORT NUMBER | | | |
| 123.210.0.1 | 10225 | 10.2.0.5 | 20001 | POSSIBLE | DOWNLINK | HIGH |
| 135.0.10.1 | 20225 | * | * | IMPOSSIBLE | UPLINK | |
| * | * | * | 12345 | IMPOSSIBLE | BIDIRECTIONAL | |
| 130.1.1.1 | * | 10.2.0.2 | * | POSSIBLE | BIDIRECTIONAL | HIGH |
| * | * | 10.2.0.1 | * | POSSIBLE | BIDIRECTIONAL | HIGH |
| * | * | 10.2.0.2 | | POSSIBLE | BIDIRECTIONAL | LOW |
| | | | | | | |

FIG.4

| SERVER ||||| TERMINAL ||||| TCP CONNECTION STATE | NO-COMMU-NICATION TIME | SUP-PRESSION | PRI-ORITY DE-GREE |
| IP ADDRESS | PORT NUM-BER | SEQUENCE NUMBER || TRANSMIS-SION THROUGH-PUT (bps) | IP ADDRESS | PORT NUM-BER | SEQUENCE NUMBER || TRANSMIS-SION THROUGH-PUT (bps) | | | | |
| | | LAST TIME | PRES-ENT | | | | LAST TIME | PRES-ENT | | | | | |
|---|---|---|---|---|---|---|---|---|---|---|---|---|---|
| 123.210.0.1 | 10225 | 3960 | 114200 | 881920 | 10.2.0.5 | 10025 | 2106 | 3360 | 10032 | ESTABLISHED | 0 | | HIGH |
| 135.0.10.1 | 443 | 1 | 1 | 0 | 10.2.0.5 | 21001 | 1 | 1 | 0 | SYN_Recv | - | | HIGH |
| 130.1.1.1 | 43210 | 33240 | 72840 | 316800 | 10.2.0.2 | 12345 | 126874 | 126874 | 0 | ESTABLISHED | 3 | | HIGH |
| 130.1.1.1 | 43210 | 1 | 1 | 0 | 10.2.0.1 | 12345 | 1 | 1 | 0 | SYN_Sent | - | | LOW |
| 135.1.10.1 | 143 | 1 | 1 | 0 | 10.2.0.2 | 7388 | 1 | 1 | 0 | SYN_Sent | | SUP-PRESSED | LOW |
| 135.1.10.1 | 443 | 1 | 1 | 0 | 10.2.0.2 | 21001 | 1 | 1 | 0 | SYN_Sent | - | SUP-PRESSED | LOW |

RADIO COMMUNICATION APPARATUS AND RADIO COMMUNICATION METHOD FOR DETERMINING RELAY PROCESSING BASED UPON POLICY INFORMATION

FIELD

The present invention relates to a radio communication apparatus that connects a local network established in a mobile body and an external network.

BACKGROUND

The Internet and the intranet in the past offer best-effort type services in most cases. The TCP (Transmission Control Protocol) is mainly used as a protocol. A terminal that performs communication using the TCP establishes a TCP connection through sequence processing called 3-way handshake between the terminal and a partner terminal and then performs transmission and reception of a TCP data packet. To realize reliable communication in a network in which a band and a delay time are unknown, the TCP includes a congestion control mechanism for controlling congestion using an acknowledgement (ACK) and a sequence number. The terminal that performs communication using the TCP autonomously controls a transmission amount of TCP packets per a unit time. Such a technology is disclosed in Non Patent Literature 1.

A broadband router that connects a local network to an external network such as the Internet includes a filtering mechanism for blocking an unauthorized packet transmitted from the external network. As a highly functional filtering method, there is an SPI (stateful packet inspection) function for dynamically setting filter conditions automatically to allow only truly-necessary packets to pass after communication is started. A router can prevent, by following a state transition of the TCP using the SPI function, intrusion of an unauthorized packet, which imitates a TCP packet, into an internal network. Such a technology is disclosed in Non Patent Literature 2.

In recent years, in mobile bodies such as a car, a train, an airplane, and a ship, it is also demanded to connect local networks on the inside of the mobile bodies to an external network such as the Internet using various radio communication systems. A part of Internet services is realized in a bus, a train, and an airplane by using the technologies disclosed in Non-Patent Literatures 1 and 2. Various apparatuses unrelated to networks in the past start to include functions assumed to be used in environments in which the networks can be used. Communication applications for performing communication using the Internet connection increase. Therefore, the communication applications range from those for business and control to those for entertainment. Kinds of communication considered to have various importance degrees and priority degrees are carried out between local networks on the inside of mobile bodies and the Internet on the outside.

As a form of use of networks in such mobile bodies, downlink traffic, which is data transfer from the external network to the local networks in the mobile bodies, such as download of map information contents or the like is more often used than uplink traffic, which is data transfer from the local networks in the mobile bodies to the external network. TCP/IP is used as a communication protocol in most of these kinds of communication. When a terminal detects a loss of a communication packet, the terminal autonomously determines that abnormality of a network occurs and performs control for limiting a packet transmission amount per unit time to enable communication.

CITATION LIST

Non Patent Literature

Non Patent Literature 1: IETF RFC793 "TRANSMISSION CONTROL PROTOCOL", September 1981

Non Patent Literature 2: "Second Edition: Difference between SPI and Dynamic Packet Filtering", (updated May 16, 2003, 21:20:00) "retrieved on Jul. 27, 2009", Internet <URL: http://plusd.itmedia.co.jp/broadband/0305/16/lp13.html>

SUMMARY

Technical Problem

However, according to the technology in the past, when a local network on the inside of a mobile body that can relatively freely move like a car is connected to the external network, the local network can be easily connected to a cellular phone network or the like. However, depending on a geographical condition such as a boundary of a service area or a temporal condition such as an action time period of a user or a traffic concentration time period, an unstable radio communication system in which the quality of a radio band, a delay time, or the like fluctuates has to be used. When such an unstable radio communication system is used, a terminal apparatus connected to the local network autonomously reduces a packet transmission amount according to the quality fluctuation. When a plurality of terminal apparatuses use the same radio communication line in the unstable radio communication system, the terminal apparatuses also autonomously reduce a packet transmission amount. As a result, a band converges in a state in which the band is impartially divided for each of connections established by the terminal apparatuses. Therefore, there is a problem in that a band corresponding to a priority degree cannot be distributed for each of the connections established by the terminal apparatuses.

When a radio communication system such as a usable cellular phone network is used as an Internet connection line for a mobile body, there is a problem in that it is difficult to add a downlink traffic transmission amount control function to the radio communication system and add anew the downlink traffic transmission amount control function to a server apparatus of various contents.

The present invention has been devised in view of the above and it is an object of the present invention to obtain a radio communication apparatus that can preferentially establish a connection of traffic having a high priority degree when a local network established in a mobile body such as a car is connected to an external network, which is another network.

Solution to Problem

There is provided a radio communication apparatus according to an aspect of the present invention mounted on a mobile body that establishes a local network using a plurality of terminals and configured to relay a packet transmitted and received between a predetermined terminal connected to the local network and a server connected to an external network, which is another network, the radio communication apparatus including: a traffic monitoring unit configured to extract header information from packets received from the server and the terminal; a policy registering section that registers policy information indicating possibility of communication connection establishment for each combination of the server and the terminal and a priority degree of the communication connection; a priority-degree determining unit configured to determine, when a packet is received from the server or the terminal, based on the header information and the policy information, whether relay processing for the packet is performed; and a traffic control unit configured to discard the received packet when the priority-degree determining unit determines that the relay processing is not performed.

Advantageous Effects of Invention

The radio communication apparatus according to the present invention realizes an effect that it is possible to preferentially establish a connection of traffic having a high priority degree.

BRIEF DESCRIPTION OF DRAWINGS

FIG. 3 is a diagram of a configuration example of a policy table.

FIG. 4 is a diagram of a configuration example of a connection table.

DESCRIPTION OF EMBODIMENTS

An embodiment of a radio communication apparatus according to the present invention is explained in detail below with reference to the drawings. The present invention is not limited by the embodiment.

First Embodiment

Figure 1:
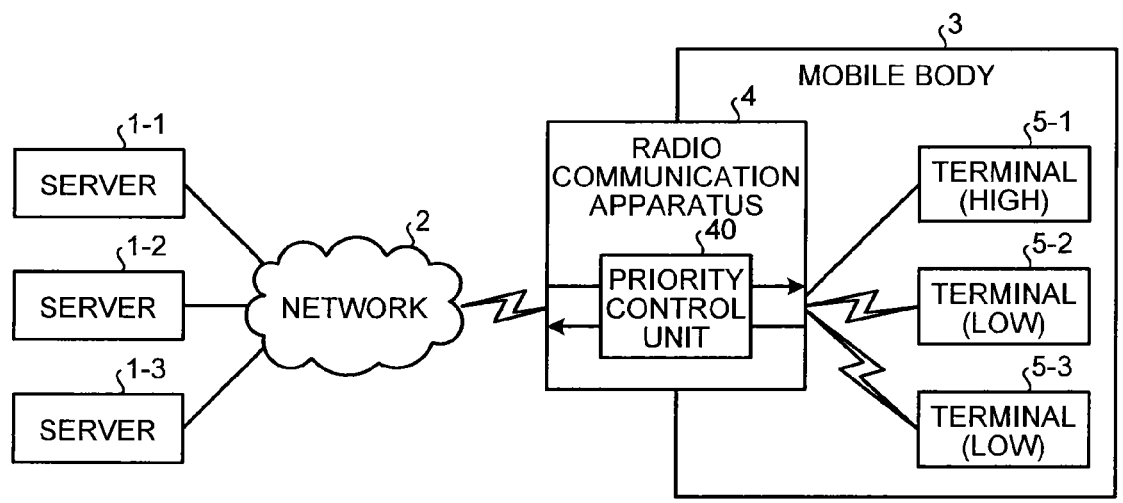
FIG. 1 is a diagram of a connection example of a radio communication apparatus.

FIG. 1 is a diagram of a connection example of a radio communication apparatus according to a first embodiment. Servers 1-1, 1-2, and 1-3 (hereinafter referred to as server 1 unless a specific server is indicated) are connected to a network 2. The network 2 and a mobile body 3 are connected via a predetermined wireless line. The mobile body 3 includes a radio communication apparatus 4. Terminals 5-1, 5-2, and 5-3 (hereinafter referred to as terminal 5 unless a specific terminal is indicated) connected to an internal network established by the mobile body 3 perform communication with the server 1 via the radio communication apparatus 4, the predetermined wireless line, and the network 2. The radio communication apparatus 4 is an apparatus that relays a packet transmitted and received between the server 1 and the terminal 5. The radio communication apparatus 4 includes a priority control unit 40. The priority control unit 40 monitors uplink traffic transmitted from the terminal 5 and downlink traffic transmitted from the server 1 and performs processing such as transfer or discarding of a packet or permission of establishment of a communication connection. In the following explanation, as an example, communication employing the TCP (Transmission Control Protocol) as a protocol is performed between the server 1 and the terminal 5.

Figure 2:
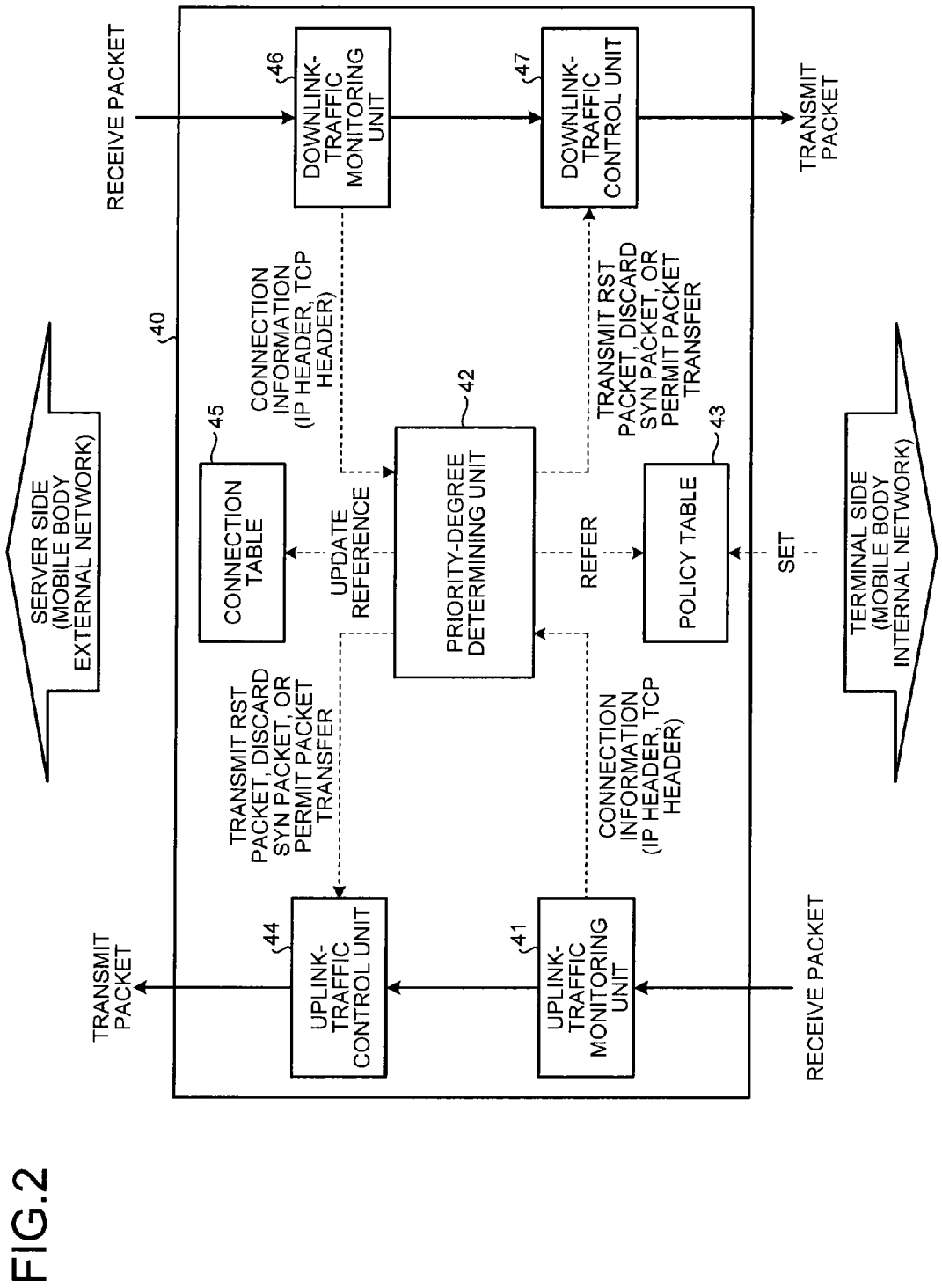
FIG. 2 is a diagram of a configuration example of a priority control unit.

The priority control unit 40 is explained. FIG. 2 is a diagram of a configuration example of the priority control unit 40. The priority control unit 40 includes an uplink-traffic monitoring unit 41, a priority-degree determining unit 42, a policy table 43, an uplink-traffic control unit 44, a connection table 45, a downlink-traffic monitoring unit 46, and a downlink-traffic control unit 47.

The uplink-traffic monitoring unit 41 receives a packet transmitted from the terminal 5, extracts connection information (IP header information and TCP header information) from the received packet, and notifies the priority-degree determining unit 42 of the connection information. The uplink-traffic monitoring unit 41 transfers a packet body to the uplink-traffic control unit 44.

The priority-degree determining unit 42 determines, based on the connection information of the received packet and policy information registered in the policy table 43, transfer, discarding, and the like of the received packet. The priority-degree determining unit 42 performs updating and changing of records of the policy table 43 and the connection table 45.

The policy table 43 is a table for storing policy information for priority degree determination. The policy information indicates possibility of establishment of a TCP connection and a priority degree of an established connection according to, for example, a combination of the server 1 and the terminal 5 and a type of the server 1 set as a destination.

FIG. 3 is a diagram of a configuration example of the policy table 43. The policy table 43 includes "server", "terminal", "TCP connection establishment possibility", "direction", and "priority degree". Regarding the server and the terminal, a target is specified using an IP address and a port number. The policy table 43 indicates whether the establishment of a TCP connection is permitted between a server and a terminal, which are described in spaces adjacent each other, in a communication direction described in a space of the direction. When the TCP connection is established, the policy table 43 indicates a priority degree of the established connection. For example, the policy table 43 indicates that, in downlink communication from a server (IP address "123.210.0.1" and port number "10225") to a terminal (IP address "10.2.0.5" and port number "20001"), the establishment of a TCP connection is permitted and a priority degree of the TCP connection is high.

An administrator or the like of the internal network of the mobile body 3 performs initial setting. The priority-degree determining unit 42 can change the TCP connection establishment possibility based on, for example, a communication state of a TCP connection having a high priority degree. For example, when the communication quality of the TCP connection having the high priority degree is deteriorated, the priority-degree determining unit 42 sets "impossible" in a space of the TCP connection establishment possibility of a TCP connection having a low priority degree registered in the policy table 43. When the communication quality of the TCP connection having the high priority degree is not deteriorated, the priority-degree determining unit 42 sets "possible" in the space.

The uplink-traffic control unit 44 performs transfer or discarding of a TCP (SYN) packet or the like based on the determination by the priority-degree determining unit 42 and performs transmission of the packet notified from the priority-degree determining unit 42.

The connection table 45 is a table for storing state information of a connection established between the server 1 and the terminal 5. The connection table 45 indicates transmission throughputs from the apparatuses (the server 1 and the terminal 5) and indicates whether the apparatuses are in a no-communication state.

FIG. 4 is a diagram of a configuration example of the connection table 45. The connection table 45 includes "server", "terminal", "TCP connection state", "no-communication time", "suppression", and "priority degree". Regarding the server and the terminal, a target is specified according to an IP address and a port number. Concerning the terminal, a sequence number is recorded according to notification from the uplink-traffic monitoring unit 41. Concerning the server, a sequence number is recorded according to notification from the downlink-traffic monitoring unit 46. Transmission throughputs of the server and the terminal are recorded. The TCP connection state indicates the present state of a TCP connection. The no-communication time is recorded when no communication is detected between the target server and the target terminal specified by the information. The suppression indicates whether a band of an established TCP connection is limited (being suppressed). The priority degree indicates a priority degree of the established TCP connection. The priority-degree determining unit 42 performs, for example, recording and updating of the connection table 45 and calculation of a transmission throughput.

For example, between a server (IP address "123.210.0.1" and port number "10225") and a terminal (IP address "10.2.0.5" and port number "10025"), it is indicated that a TCP connection state is "ESTABLISHED" and no communication is not detected, the suppression is not performed, and the TCP connection is a connection with a high priority degree. It is indicated that the last sequence number of a packet received from the server is "3960" and the present sequence number of the packet is "114200" and a transmission throughput of the packet from the server is "881920 bps". Similarly, the last sequence number of a packet received from the terminal is "2106" and the present sequence number of the packet is "3360" and a transmission throughput of the packet received from the terminal is "10032 bps".

The downlink-traffic monitoring unit 46 receives a packet transmitted from the server 1, extracts connection information (IP header information and TCP header information) from the received packet, and notifies the priority-degree determining unit 42 of the connection information. The downlink-traffic monitoring unit 46 transfers a packet body to the downlink-traffic control unit 47.

The downlink-traffic control unit 47 performs transfer and discarding of a TCP (SYN) packet or the like based on the determination by the priority-degree determining unit 42 and performs transmission of the packet notified from the priority-degree determining unit 42.

The operation of the radio communication apparatus 4 is explained. First, an operation for establishing a TCP connection according to a TCP (SYN) packet from the terminal 5 is explained.

Figure 5:
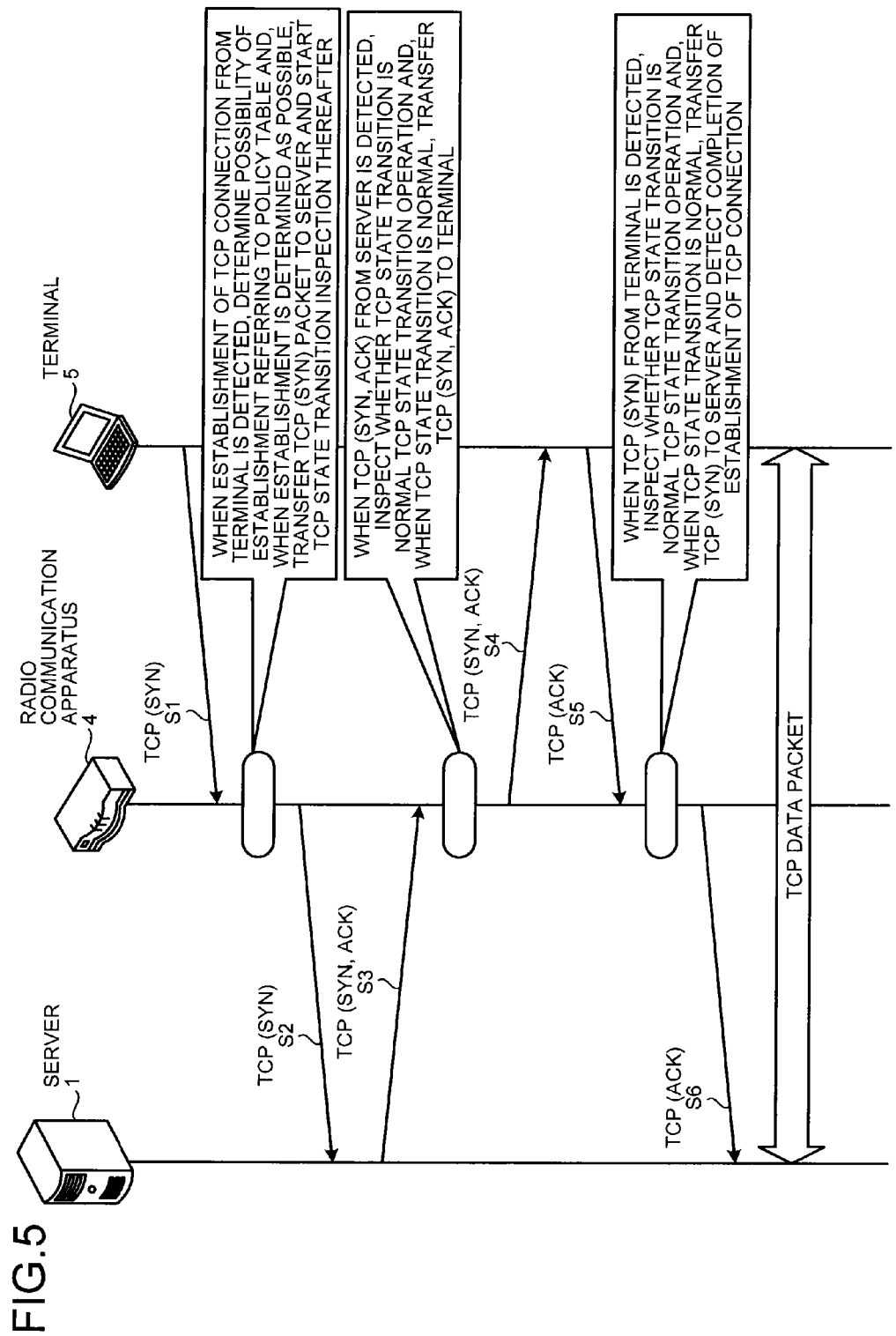
FIG. 5 is a sequence chart of an operation for establishing a TCP connection.

FIG. 5 is a sequence chart of an operation performed when a TCP connection is established from the terminal 5. First, when the terminal 5 transmits a TCP (SYN) packet in which an SYN flag in a TCP header is set and an ACK flag is not set, the radio communication apparatus 4 receives the TCP (SYN) packet (step S1).

In the radio communication apparatus 4, the uplink-traffic monitoring unit 41 of the priority control unit 40 extracts connection information (TCP header information and IP header information) of the packet and notifies the priority-degree determining unit 42 of the connection information. The priority-degree determining unit 42 determines, referring to the policy table 43 in which the policy information for priority degree determination is stored, whether the connection information indicates traffic for which priority degree determination processing is performed, whether the connection information indicates TCP traffic for which TCP connection establishment is permitted, and whether the connection information indicates proper transmission source and destination port numbers.

When the priority-degree determining unit 42 determines that the start of TCP connection establishment is permitted, the priority-degree determining unit 42 notifies the uplink-traffic control unit 44 of TCP (SYN) packet transfer permission. The uplink-traffic control unit 44 transfers the TCP (SYN) packet to the server 1 (step S2). At this point, the priority-degree determining unit 42 adds information concerning the TCP connection to the connection table 45 and starts inspection of TCP state transition thereafter.

The server 1 receives the TCP (SYN) packet and transmits a TCP (SYN, ACK) packet as a response to the TCP (SYN) packet and the radio communication apparatus 4 receives the TCP (SYN, ACK) packet (step S3).

In the radio communication apparatus 4, the downlink-traffic monitoring unit 46 of the priority control unit 40 extracts connection information (TCP header information and IP header information) of the packet and notifies the priority-degree determining unit 42 of the connection information. The priority-degree determining unit 42 inspects whether the TCP state transition operation is normal. When the TCP state transition is normal, the priority-degree determining unit 42 notifies the downlink-traffic control unit 47 of a TCP (SYN, ACK) packet transfer permission. The downlink-traffic control unit 47 transfers the TCP (SYN, ACK) packet to the terminal 5 (step S4).

The terminal 5 receives the TCP (SYN, ACK) packet and transmits a TCP (ACK) packet as a response to the TCP (SYN, ACK) packet and the radio communication apparatus 4 receives the TCP (ACK) packet (step S5).

In the radio communication apparatus 4, the uplink-traffic monitoring unit 41 of the priority control unit 40 extracts connection information (TCP header information and IP header information) of the packet and notifies the priority-degree determining unit 42 of the connection information. The priority-degree determining unit 42 inspects whether the TCP state transition is a normal TCP state transition operation. When the TCP state transition is normal, the priority-degree determining unit 42 permits the transfer of the TCP (ACK) packet. The uplink-traffic control unit 44 transfers the TCP (ACK) packet to the server 1 (step S6).

Thereafter, a TCP connection is established between the server 1 and the terminal 5 and a TCP data packet is transmitted and received between the server 1 and the terminal 5. After permitting the establishment of a sequence of the TCP connection, the priority-degree determining unit 42 stores IP addresses and port numbers of the both ends (the server 1 and the terminal 5) of the TCP connection in the connection table 45 and recognizes and manages a TCP state transition of the TCP connection.

Specifically, the downlink-traffic monitoring unit 46 detects a sequence number of the TCP data packet transferred in the TCP connection and notifies the priority-degree determining unit 42 of the sequence number. The priority-degree determining unit 42 updates, based on the notification from the downlink-traffic monitoring unit 46, registered contents of the connection table 45 and estimates an approximate TCP traffic amount from the number of updates (the number of detections of the sequence number) per unit time. The priority-degree determining unit 42 records the estimated TCP traffic amount as a transfer throughput of the server of the connection table 45.

Similarly, the uplink-traffic monitoring unit 41 detects a sequence number of the TCP data packet transferred in the TCP connection and notifies the priority-degree determining unit 42 of the sequence number. The priority-degree determining unit 42 updates, based on the notification from the uplink-traffic monitoring unit 41, the registered contents of the connection table 45 and estimates an approximate TCP retransmission request ratio (a ratio of the number of retransmission requests to TCP traffic per unit time) from the number of updates (the number of detections of the sequence number) per unit time. The priority-degree determining unit 42 records the estimated TCP retransmission request ratio as a transmission throughput of the terminal of the connection table 45.

Figure 6:
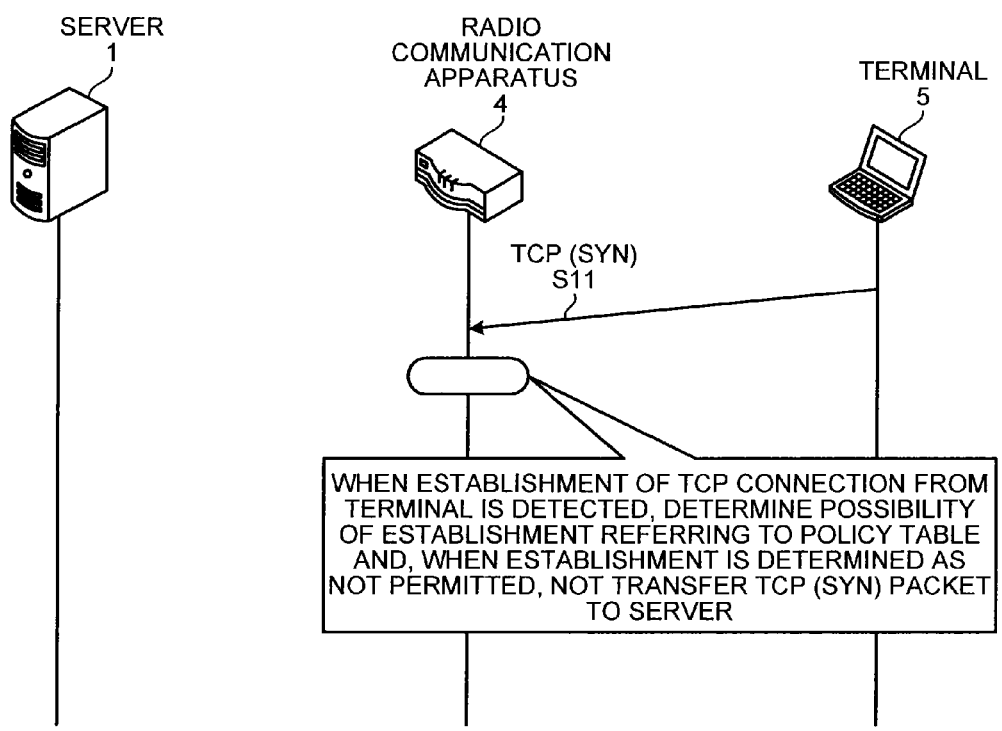
FIG. 6 is a sequence chart of an operation for establishing a TCP connection.

On the other hand, an operation performed when a TCP connection is not established for the TCP (SYN) packet from the terminal 5 is explained. FIG. 6 is a sequence chart of an operation performed when a TCP connection is attempted from the terminal 5 and subsequently not established.

First, when the terminal 5 transmits a TCP (SYN) packet in which an SYN flag in a TCP header is set and an ACK flag is not set, the radio communication apparatus 4 receives the TCP (SYN) packet (step S11).

In the radio communication apparatus 4, the uplink-traffic monitoring unit 41 of the priority control unit 40 extracts connection information (TCP header information and IP header information) of the packet and notifies the priority-degree determining unit 42 of the connection information. The priority-degree determining unit 42 determines, referring to the policy table 43 in which the policy information for priority degree determination is stored, whether the connection information indicates traffic for which priority degree determination processing is performed, whether the connection information indicates TCP traffic for which TCP connection establishment is permitted, and whether the connection information indicates proper transmission source and destination port numbers.

When the priority-degree determining unit 42 determines that the TCP connection establishment is not permitted, the priority-degree determining unit 42 does not permit the transfer of the TCP (SYN) packet, notifies the uplink-traffic control unit 44 of discarding of the TCP (SYN) packet. The uplink-traffic control unit 44 discards the TCP (SYN) packet.

The priority-degree determining unit 42 performs the determination in this way to thereby not permit, concerning a TCP connection with a low priority degree, the establishment of a TCP connection through the priority degree determination processing even if the connection information is the TCP traffic for which TCP connection establishment is permitted or the proper transmission source and destination port numbers. Consequently, it is possible to prevent deterioration in a throughput (communication quality) of a TCP connection of high priority traffic already established and maintain the throughput. In this case, concerning the TCP connection with a low priority degree, the TCP connection establishment possibility of the policy table 43 is "impossible".

As explained above, in this embodiment, when the radio communication apparatus 4 receives a TCP (SYN) packet from the terminal 5, the priority control unit 40 extracts connection information from the received packet and determines, based on the policy information registered in the policy table 43, possibility of establishment of a TCP connection. Consequently, because it is possible to not permit the establishment of a TCP connection of low priority traffic, it is possible to prevent deterioration in a throughput (communication quality) of a TCP connection of high priority traffic already established.

Second Embodiment

In the following explanation of a second embodiment, a TCP connection is established according to a TCP (SYN) packet from the server 1. A connection relation among apparatuses and the configurations of the apparatuses are the same as those in the first embodiment. Differences from the first embodiment are explained.

Figure 7:
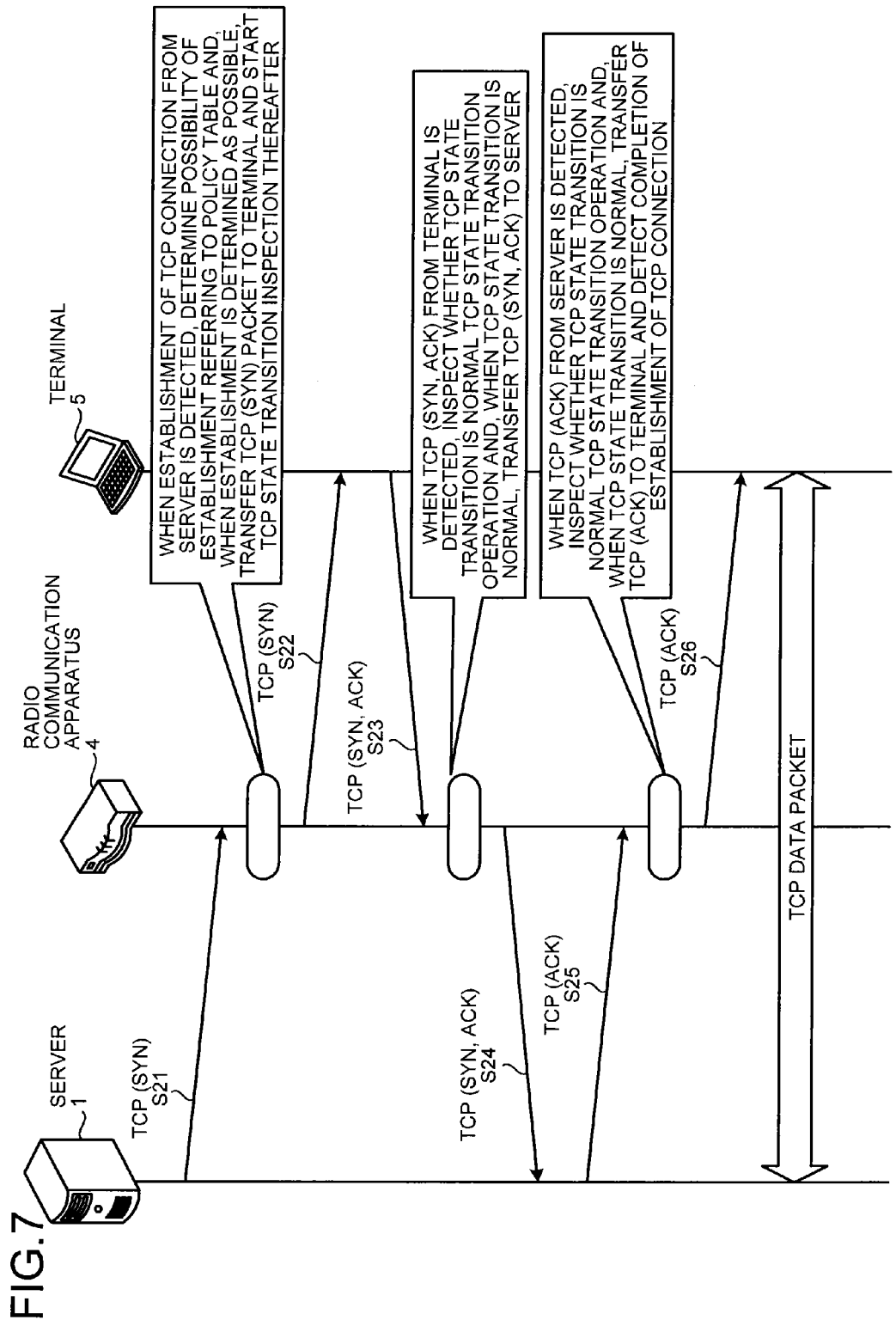
FIG. 7 is a sequence chart of an operation for establishing a TCP connection.

FIG. 7 is a sequence chart of an operation performed when a TCP connection is established from the server 1. First, when the server 1 transmits a TCP (SYN) packet in which an SYN flag in a TCP header is set and an ACK flag is not set, the radio communication apparatus 4 receives the TCP (SYN) packet (step S21).

In the radio communication apparatus 4, the downlink-traffic monitoring unit 46 of the priority control unit 40 extracts connection information (TCP header information and IP header information) of the packet and notifies the priority-degree determining unit 42 of the connection information. The priority-degree determining unit 42 determines, referring to the policy table 43 in which the policy information for priority degree determination is stored, whether the connection information indicates traffic for which priority degree determination processing is performed, whether the connection information indicates TCP traffic for which TCP connection establishment is permitted, and whether the connection information indicates proper transmission source and destination port numbers.

When the priority-degree determining unit 42 determines that the start of TCP connection establishment is permitted, the priority-degree determining unit 42 notifies the downlink-traffic control unit 47 of a TCP (SYN) packet transfer permission. The downlink-traffic control unit 47 transfers the TCP (SYN) packet to the terminal 5 (step S22). At this point, the priority-degree determining unit 42 adds information concerning the TCP connection to the connection table 45 and starts inspection of TCP state transition thereafter.

The terminal 5 receives the TCP (SYN) packet and transmits a TCP (SYN, ACK) packet as a response to the TCP (SYN) packet and the radio communication apparatus 4 receives the TCP (SYN, ACK) packet (step S23).

In the radio communication apparatus 4, the uplink-traffic monitoring unit 41 of the priority control unit 40 extracts connection information (TCP header information and IP header information) of the packet and notifies the priority-degree determining unit 42 of the connection information. The priority-degree determining unit 42 inspects whether the TCP state transition is a normal TCP state transitioning operation. When the TCP state transition is normal, the priority-degree determining unit 42 notifies the uplink-traffic control unit 44 of a TCP (SYN, ACK) packet transfer permission. The uplink-traffic control unit 44 transfers the TCP (SYN, ACK) packet to the server 1 (step S24).

The server 1 receives the TCP (SYN, ACK) packet and transmits a TCP (ACK) packet as a response to the TCP (SYN, ACK) packet and the radio communication apparatus 4 receives the TCP (ACK) packet (step S25).

In the radio communication apparatus 4, the downlink-traffic monitoring unit 46 of the priority control unit 40 extracts connection information (TCP header information and IP header information) of the packet and notifies the priority-degree determining unit 42 of the connection information. The priority-degree determining unit 42 inspects whether the TCP state transition is a normal TCP state transition operation. When the TCP state transition is normal, the priority-degree determining unit 42 permits the transfer of the TCP (ACK) packet. The downlink-traffic control unit 47 transfers the TCP (ACK) packet to the terminal 5 (step S26).

Figure 8:
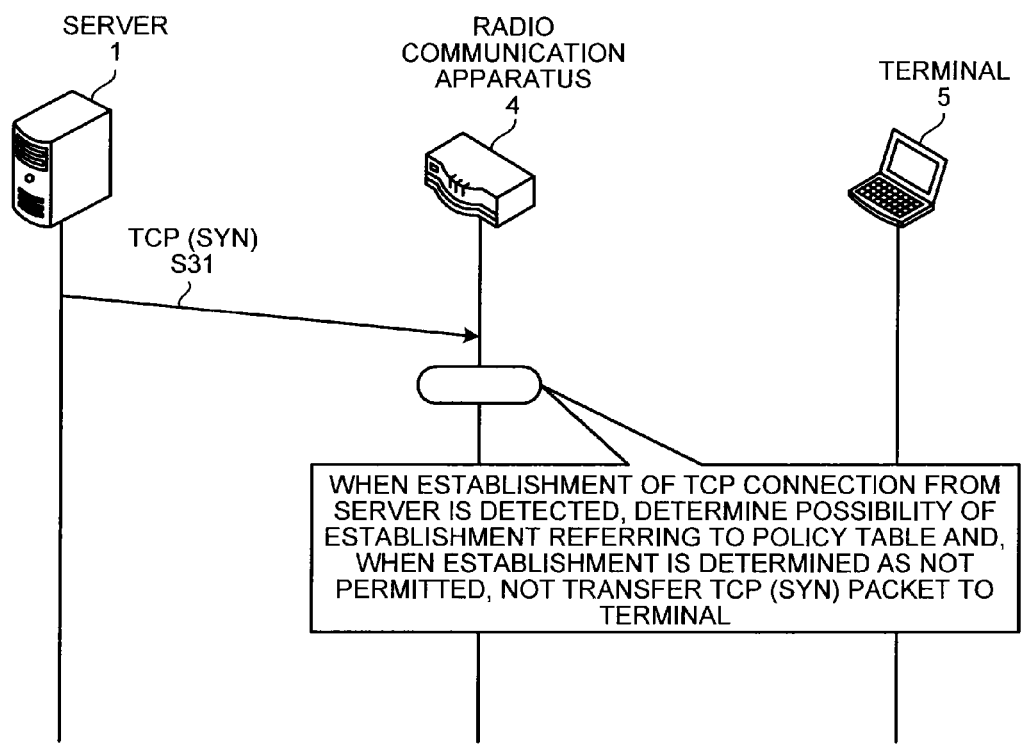
FIG. 8 is a sequence chart of an operation for establishing a TCP connection.

Thereafter, a TCP connection is established between the server 1 and the terminal 5 and a TCP data packet is transmitted and received between the server 1 and the terminal 5. After permitting the establishment of a sequence of the TCP connection, the priority-degree determining unit 42 stores IP addresses and port numbers of the both ends (the server 1 and the terminal 5) of the TCP connection in the connection table 45 and recognizes and manages a TCP state transition of the TCP connection. Specific processing is the same as the processing in the first embodiment On the other hand, an operation performed when a TCP connection is not established for the TCP (SYN) packet from the server 1 is explained. FIG. 8 is a sequence chart of an operation performed when a TCP connection is attempted from the server 1 and subsequently not established.

First, when the server 1 transmits a TCP (SYN) packet in which an SYN flag in a TCP header is set and an ACK flag is not set, the radio communication apparatus 4 receives the TCP (SYN) packet (step S31).

In the radio communication apparatus 4, the downlink-traffic monitoring unit 46 of the priority control unit 40 extracts connection information (TCP header information and IP header information) of the packet and notifies the priority-degree determining unit 42 of the connection information. The priority-degree determining unit 42 determines, referring to the policy table 43 in which the policy information for priority degree determination is stored, whether the connection information indicates traffic for which priority degree determination processing is performed, whether the connection information indicates TCP traffic for which TCP connection establishment is permitted, and whether the connection information indicates proper transmission source and destination port numbers.

When the priority-degree determining unit 42 determines that the TCP connection establishment is not permitted, the priority-degree determining unit 42 does not permit the transfer of the TCP (SYN) packet and notifies the downlink-traffic control unit 47 of discarding of the TCP (SYN) packet. The downlink-traffic control unit 47 discards the TCP (SYN) packet.

As explained above, in this embodiment, when the radio communication apparatus 4 receives a TCP (SYN) packet from the server 1, the priority control unit 40 extracts connection information from the received packet and determines, based on the policy information registered in the policy table 43, possibility of establishment of a TCP connection. Consequently, as in the first embodiment, because it is possible to not permit the establishment of a TCP connection of low priority traffic, it is possible to prevent deterioration in a throughput (communication quality) of a TCP connection of high priority traffic already established.

In view of the contents explained in the first and second embodiments, the radio communication apparatus 4 can perform keep-alive processing when the radio communication apparatus 4 detects no communication.

Figure 9:
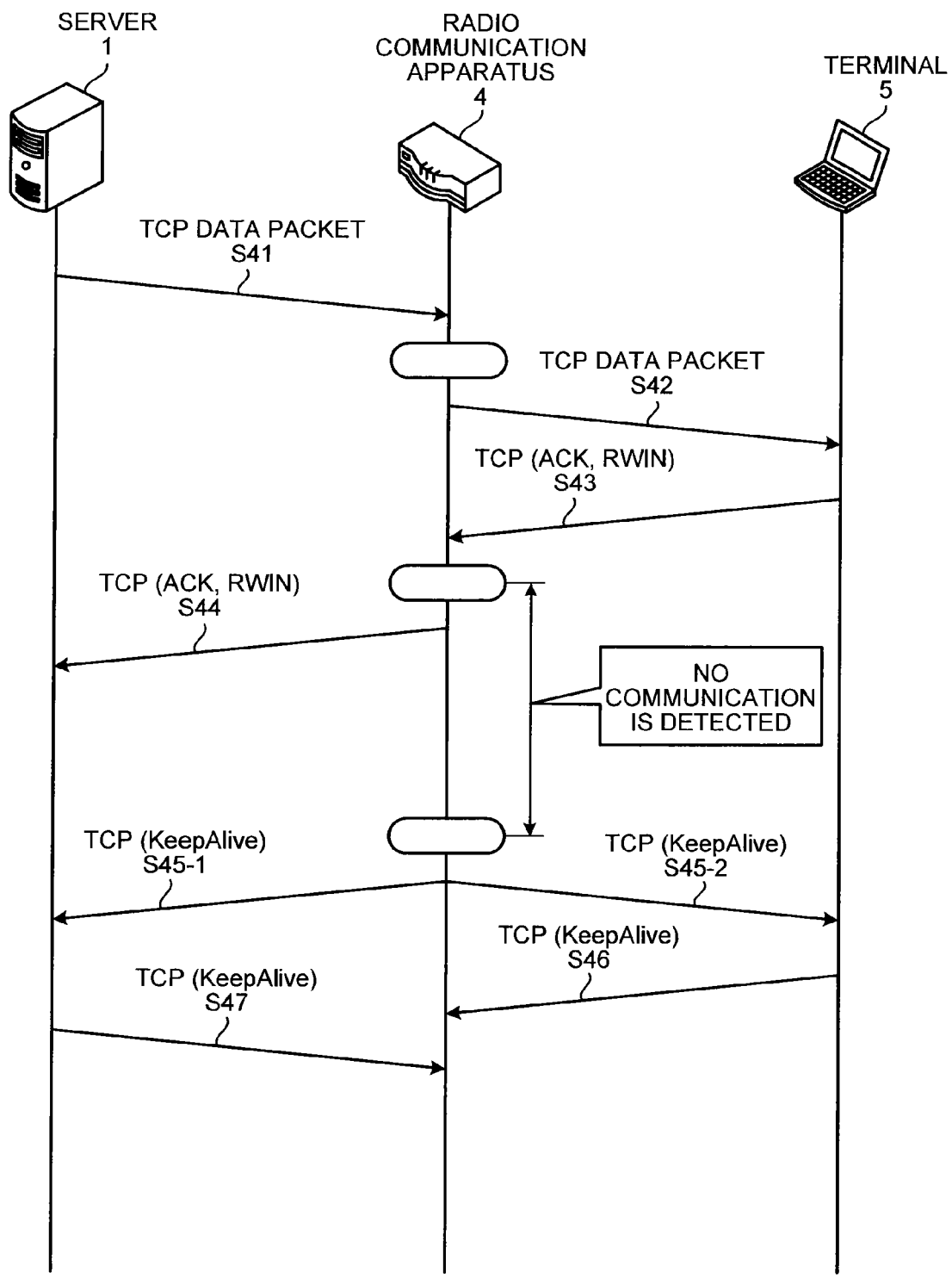
FIG. 9 is a sequence chart of keep-alive processing of the TCP during no-communication detection.

In the radio communication apparatus 4, the priority-degree determining unit 42 estimates a TCP traffic amount per unit time and a TCP retransmission request ratio. Therefore, for example, the priority-degree determining unit 42 can estimate that communication is not performed (a packet is not received) because, although a TCP connection is established, update of a sequence number is not performed. In this case, the priority-degree determining unit 42 transmits a KeepAlive packet of the TCP to the server 1 and the terminal 5 and checks, according to presence or absence of a response to the KeepAlive packet, whether the TCP connection is alive. FIG. 9 is a sequence chart of keep-alive processing of the TCP during no-communication detection.

When a TCP connection is established between the server 1 and the terminal 5 according to the operation shown in FIG. 5 or 7, for example, the server 1 transmits a TCP data packet (step S41). The radio communication apparatus 4 transfers the TCP data packet to the terminal 5 (step S42). The terminal 5 transmits a TCP (ACK, RWIN) packet as a response to the received TCP data packet (step S43). The radio communication apparatus 4 transfers the TCP (ACK, RWIN) packet to the server 1 (step S44).

Thereafter, in the radio communication apparatus 4, according to notification from the uplink-traffic monitoring unit 41 and the downlink-traffic monitoring unit 46, the priority-degree determining unit 42 detects no communication because communication is not performed between the server 1 and the terminal 5 for a predetermined period. In this case, the priority-degree determining unit 42 performs, as the keep-alive processing, determination for transmitting a TCP (KeepAlive) packet. The priority-degree determining unit 42 transmits the TCP (KeepAlive) packet from the uplink-traffic control unit 44 to the server 1 (step S45-1). The priority-degree determining unit 42 transmits the TCP (KeepAlive) packet from the downlink-traffic control unit 47 to the terminal 5 (step S45-2).

In the radio communication apparatus 4, the priority-degree determining unit 42 continues the establishment of a TCP connection of a keep-alive target when the priority-degree determining unit 42 receives, within a period specified in advance, from the uplink-traffic monitoring unit 41, notification indicating that the TCP (KeepAlive) packet from the terminal 5 is received (step S46) and when the priority-degree determining unit 42 receives, within the period specified in advance, from the downlink-traffic monitoring unit 46, notification that the TCP (KeepAlive) packet from the server 1 is received (step S47).

Figure 10:
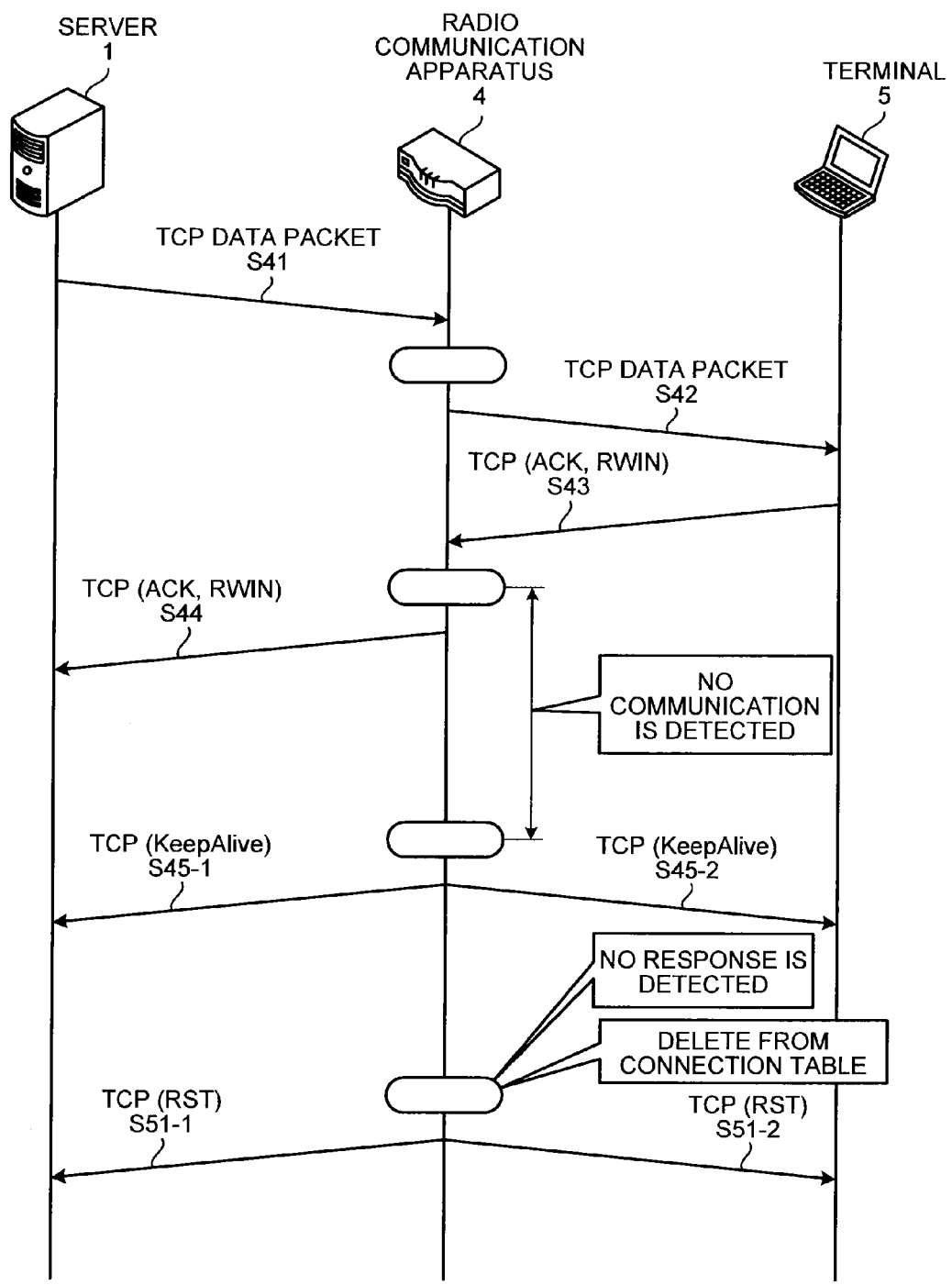
FIG. 10 is a sequence chart of the keep-alive processing of the TCP during no-communication detection.

On the other hand, the keep-alive processing performed when a response to the TCP (KeepAlive) packet is not received from the terminal 5 and the server 1 within the period specified in advance is shown in FIG. 10. FIG. 10 is a sequence chart of the keep-alive processing of the TCP during no-communication detection. Processing from step S41 to steps S45-1 and S45-2 is the same as the processing shown in FIG. 9. In the radio communication apparatus 4, when the priority-degree determining unit 42 does not receive a response to the TCP (KeepAlive) packet from both of the terminal 5 and the server 1 within the period specified in advance, the priority-degree determining unit 42 detects no response. The priority-degree determining unit 42 determines that a TCP connection of a keep-alive target is cancelled and deletes the TCP connection from the connection table 45. The priority-degree determining unit 42 transmits a TCP (RST) packet from the uplink-traffic control unit 44 to the server 1 (step S51-1) and transmits the TCP (RST) packet from the downlink-traffic control unit 47 to the terminal 5 (step S51-2).

In the above explanation, when the priority-degree determining unit 42 of the radio communication apparatus 4 does not receive a response from both of the terminal 5 and the server 1, the priority-degree determining unit 42 of the radio communication apparatus 4 determines that the TCP connection of the keep-alive target is cancelled. However, this is not a limitation. For example, when a response from both of the terminal 5 and the server 1 are not received even if the TCP (KeepAlive) packet is retransmitted or when a TCP (RST) packet in which an RST flag of a TCP header is set is returned from the terminal 5 or the server 1, the priority-degree determining unit 42 can determine that the TCP connection of the keep-alive target is cancelled.

In this way, when the radio communication apparatus 4 detects no communication between the server 1 and the terminal 5, the radio communication apparatus 4 can cancel a TCP connection in a no-communication state by performing the keep-alive processing.

Third Embodiment

In a third embodiment, a method of disconnecting a TCP connection of low-priority traffic and improving communication quality of a TCP connection of high-priority traffic when deterioration is detected in the TCP connection of the high-priority traffic is explained. Differences from the first and second embodiments are explained.

In the radio communication apparatus 4, the priority-degree determining unit 42 of the priority control unit 40 updates a sequence number of a TCP connection registered in the connection table 45 and manages a state of the TCP connection. Therefore, in some case, the priority-degree determining unit 42 detects, from an observation result of a sequence number transmitted and received in a TCP connection of high-priority traffic, a packet loss and retransmission frequently occur in the TCP connection of the high-priority traffic exceeding thresholds specified in advance and communication quality is deteriorated. In this case, to improve the communication quality of the TCP connection of the high-priority traffic, the priority-degree determining unit 42 limits (suppresses) a band of a TCP connection of low-priority traffic. When the priority-degree determining unit 42 further detects deterioration in the TCP connection of the high-priority traffic, the priority-degree determining unit 42 transmits a TCP (RST) packet in which an RST flag of a TCP header is set to the server 1 and the terminal 5 and forcibly disconnects the TCP connection of the low-priority traffic.

Figure 11:
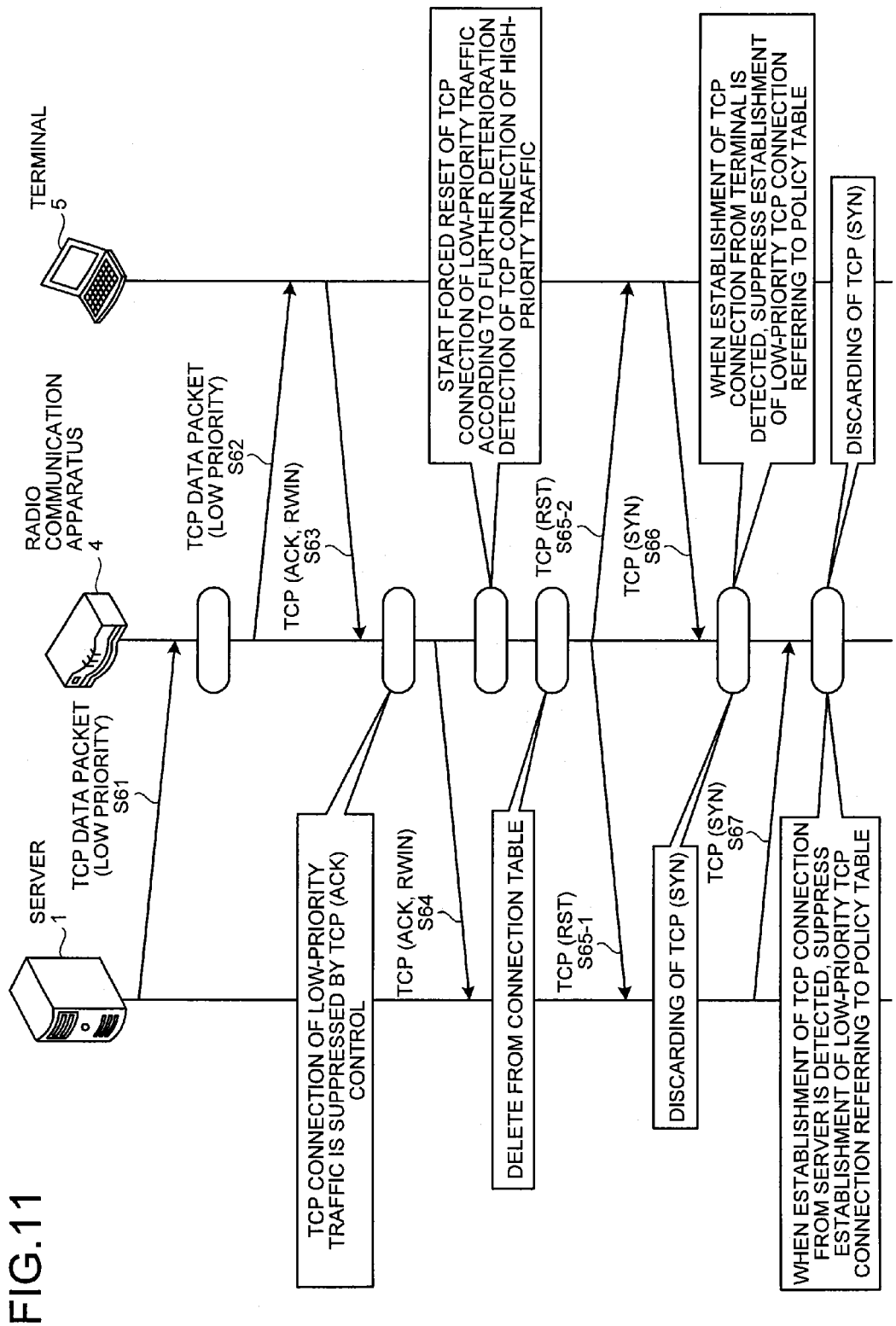
FIG. 11 is a sequence chart of TCP connection reset processing and SYN packet discard processing for low priority traffic.

FIG. 11 is a sequence chart of TCP connection reset processing and SYN packet discarding processing for low-priority traffic performed when deterioration is detected in a TCP connection of high-priority traffic. First, the server 1 transmits a low-priority TCP data packet (step S61). The radio communication apparatus 4 transfers the low-priority TCP data packet to the terminal 5 (step S62). The terminal 5 transmits a TCP (ACK, RWIN) packet as a response to the received low-priority TCP data packet (step S63). The radio communication apparatus 4 transfers the TCP (ACK, RWIN) packet to the server 1 (step S64). At this point, in the radio communication apparatus 4, the priority-degree determining unit 42 of the priority control unit 40 detects that communication quality of the TCP connection of the high-priority traffic is deteriorated and performs determination for limiting (suppressing) a band of the TCP connection of the low-priority traffic according to TCP (ACK) control. The units that actually perform the band limitation are the uplink-traffic control unit 44 and the downlink-traffic control unit 47.

In the radio communication apparatus 4, the priority-degree determining unit 42 detects further deterioration in the communication quality in the TCP connection of the high-priority traffic according to notification from the uplink-traffic monitoring unit 41 or the downlink-traffic monitoring unit 46. In this case, to eliminate the deterioration in the TCP connection of the high-priority traffic and improve the communication quality, the priority-degree determining unit 42 performs processing for forcibly resetting the TCP connection of the low-priority traffic. First, the priority-degree determining unit 42 deletes the TCP connection of the low-priority traffic to be subjected to the reset processing from the connection table 45. Subsequently, the priority-degree determining unit 42 performs determination for transmitting a TCP (RST) packet, transmits the TCP (RST) packet from the uplink-traffic control unit 44 to the server 1 (step S65-1), and transmits the TCP (RST) packet from the downlink-traffic control unit 47 to the terminal 5 (step S65-2).

The server 1 and the terminal 5 that use the TCP connection of the low-priority traffic to be forcibly disconnected at this point are likely to start reestablishment of a TCP connection. To block the reestablishment processing, the priority-degree determining unit 42 temporarily changes the policy information concerning the TCP connection registered in the policy table 43 and discards a TCP (SYN) packet involved in the reestablishment. As a method of temporarily changing the policy information, for example, there is a method of changing the space of the TCP connection establishment possibility of the policy table 43 (see FIG. 3) from "possible" to "impossible". However, this is not a limitation. A state of the deterioration for elimination of which the priority-degree determining unit 42 determines to forcibly reset the TCP connection of the low-priority traffic and a state of the deterioration due to which the establishment of the TCP connection is not permitted explained in the first embodiment can be the same state.

In FIG. 11, the radio communication apparatus 4 receives a TCP (SYN) packet transmitted from the terminal 5 (step S66). The priority-degree determining unit 42 receives notification of traffic information from the uplink-traffic monitoring unit 41 and performs, based on the temporarily-changed policy information registered in the policy table 43, determination for suppressing the establishment of a TCP connection. Specifically, the priority-degree determining unit 42 notifies the uplink-traffic control unit 44 of discarding of the TCP (SYN) packet. The uplink-traffic control unit 44 discards the TCP (SYN) packet.

Similarly, the radio communication apparatus 4 receives a TCP (SYN) packet transmitted from the server 1 (step S67). The priority-degree determining unit 42 receives notification of traffic information from the downlink-traffic monitoring unit 46 and performs, based on the temporarily-changed policy information registered in the policy table 43, determination for suppressing the establishment of a TCP connection. Specifically, the priority-degree determining unit 42 notifies the downlink-traffic control unit 47 of discarding of the TCP (SYN) packet. The downlink-traffic control unit 47 discards the TCP (SYN) packet.

In this case, when the radio communication apparatus 4 detects deterioration in communication quality in the TCP connection of the high-priority traffic, the radio communication apparatus 4 can improve the communication quality of the TCP connection of the high-priority traffic by forcibly disconnecting the TCP connection of the low-priority traffic.

In a state in which the TCP connection of the low-priority traffic is forcibly disconnected and reestablishment is blocked, when a packet loss in the TCP connection of the high-priority traffic is recovered and the communication quality is improved and the priority-degree determining unit 42 determines that communication of the TCP connection of the low-priority traffic is possible, the priority-degree determining unit 42 changes the policy information again and permits establishment of the TCP connection of the low-priority traffic.

Figure 12:
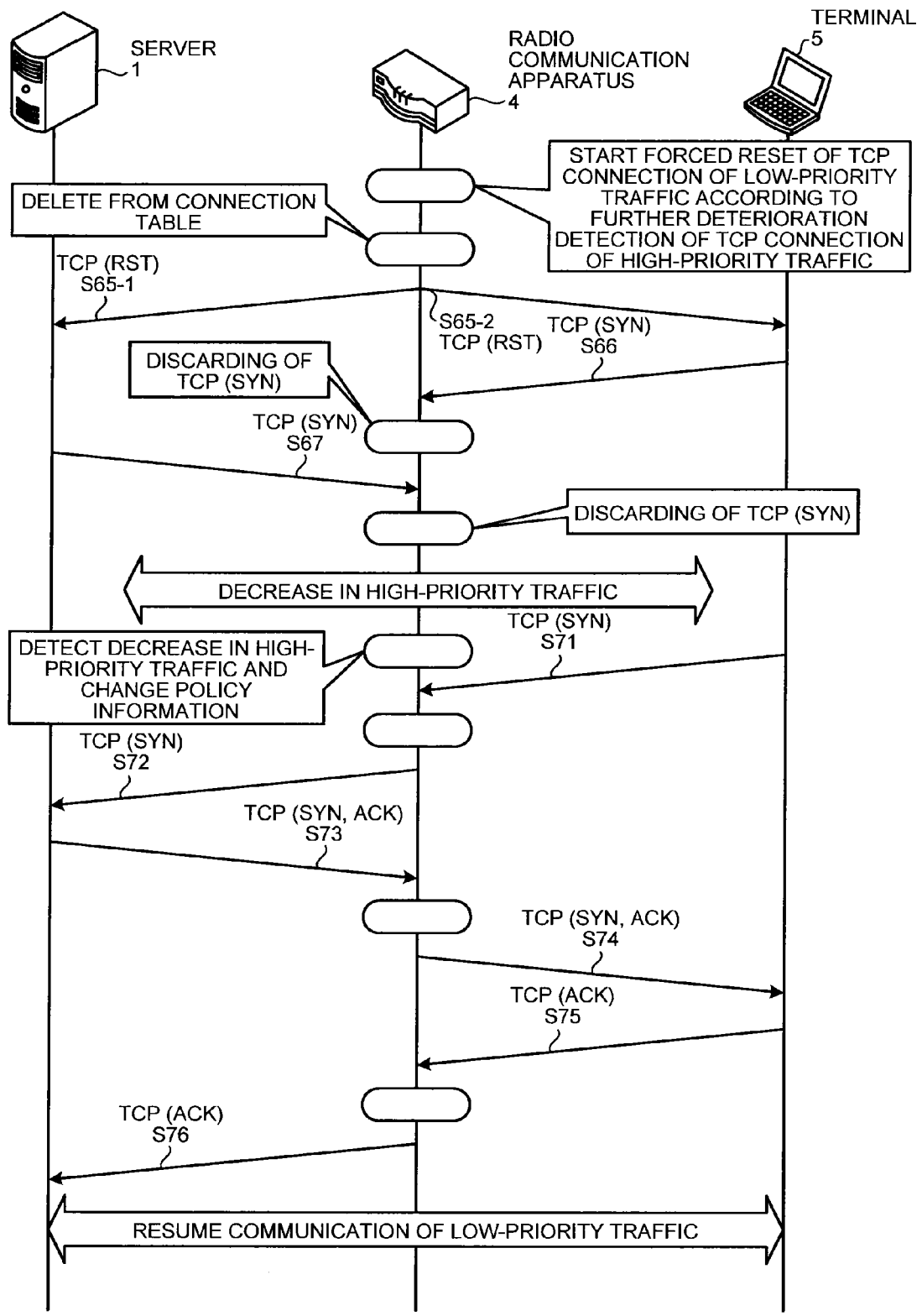
FIG. 12 is a sequence chart of an operation for re-permission of TCP connection establishment for the low priority traffic.

FIG. 12 is a sequence chart of an operation for re-permitting TCP connection establishment of low-priority traffic. Processing from steps S65-1 and S65-2 to step S67 is the same as the processing shown in FIG. 11. Therefore, explanation of the processing is omitted.

In the radio communication apparatus 4, when the establishment of the TCP connection of the low-priority traffic is blocked based on the temporarily-changed policy information, the priority-degree determining unit 42 detects that the high-priority traffic decreases. In other words, the priority-degree determining unit 42 detects that the communication quality is improved in the TCP connection of the high-priority traffic. In this case, the priority-degree determining unit 42 changes the temporarily-changed policy information registered in the policy table 43 again. Thereafter, processing (steps S71 to S76) in the radio communication apparatus 4 performed when a TCP (SYN) packet is received from the terminal 5 is the same as the processing (steps S1 to S6) shown in FIG. 5 explained in the first embodiment. When the establishment of a TCP connection is permitted, communication is resumed in the TCP connection of the low-priority traffic.

In this way, even if the radio communication apparatus 4 forcibly disconnects the TCP connection of the low-priority traffic, when the improvement of the communication quality is detected in the TCP connection of the high-priority traffic, it is possible to resume the communication of the TCP connection of the low-priority traffic. As a method of changing the policy information again, there is a method of resetting the policy information to a state before the change. However, this is not a limitation.

As explained above, in this embodiment, when the radio communication apparatus 4 detects deterioration in the communication quality in the TCP connection of the high-priority traffic, the radio communication apparatus 4 disconnects the TCP connection of the low-priority traffic. Consequently, it is possible to secure a band used in the TCP connection of the low-priority traffic and improve the communication quality of the TCP connection of the high-priority traffic.

After the TCP connection of the low-priority traffic is disconnected, when a decrease in the high-priority traffic is detected, the establishment of the TCP connection of the low-priority traffic can be permitted again. Consequently, it is possible to adaptively cope with the reestablishment of the TCP connection of the low-priority traffic while giving priority to the TCP connection of the high-priority traffic.

In the explanation of the first to third embodiments, the types of priority degrees are two types: high and low. However, this is not a limitation. The present invention can also be applied when the types of priority degrees are three or more types.

INDUSTRIAL APPLICABILITY

As explained above, the radio communication apparatus according to the present invention is useful as an apparatus that connects networks. In particular, the radio communication apparatus is suitable in connecting a local network to an external network.

REFERENCE SIGNS LIST 1-1, 1-2, 1-3 SERVERS
2 NETWORK
3 MOBILE BODY
4 RADIO COMMUNICATION APPARATUS
5-1, 5-2, 5-3 TERMINALS
40 PRIORITY CONTROL UNIT
41 UPLINK-TRAFFIC MONITORING UNIT
42 PRIORITY-DEGREE DETERMINING UNIT
43 POLICY TABLE
44 UPLINK-TRAFFIC CONTROL UNIT
45 CONNECTION TABLE
46 DOWNLINK-TRAFFIC MONITORING UNIT
47 DOWNLINK-TRAFFIC CONTROL UNIT

The invention claimed is:

1. A radio communication apparatus mounted on a mobile body that establishes a local network using a plurality of terminals and configured to relay a packet transmitted and received between a predetermined terminal connected to the local network and a server connected to an external network, which is another network, the radio communication apparatus comprising:
   a non-transitory storage medium storing instructions, which when executed, cause the radio communication apparatus to perform as:
      a traffic monitoring unit configured to extract header information from packets received from the server and the terminal;
      a policy registering section that registers policy information indicating possibility of communication connection establishment for each combination of the server and the terminal and a priority degree of the communication connection;
      a priority-degree determining unit configured to determine, when a packet is received from the server or the terminal, based on the header information and the policy information, whether relay processing for the packet is performed;
      a traffic control unit configured to discard the received packet when the priority-degree determining unit determines that the relay processing is not performed; and
      a quality recording section that records communication quality of an established communication connection, wherein
   when communication quality of a communication connection having a predetermined priority degree is equal to or lower than a priority degree non-permission threshold, which is a threshold for not permitting establishment of a communication connection having a priority degree lower than the predetermined priority degree, the priority-degree determining unit sets the policy information to discard an establishment request packet for a communication connection having a priority degree lower than the predetermined priority degree,
   when communication quality of a communication connection having a predetermined priority degree is equal to or lower than a low priority degree band limit threshold, which is a threshold for limiting a band of a communication connection having a priority degree lower than the predetermined priority degree, the priority-degree determining unit determines that the band of the communication connection having the priority degree lower than the predetermined priority degree is set smaller than a band of the communication connection having the predetermined priority degree,
   the traffic control unit sets, according to the determination by the priority-degree determining unit the band of the communication connection having the priority degree lower than the predetermined priority degree smaller than the band of the communication connection having the predetermined priority degree and performs transmission of a packet, when communication quality of the communication connection having the predetermined priority degree is equal to or lower than a low priority degree disconnection threshold. which is a threshold for disconnecting the communication connection having the priority degree lower than the predetermined priority degree the lower priority degree disconnection threshold less than the low priority degree band limit threshold, the priority-degree determining unit deletes a record of the communication connection having the low priority degree from the quality recording section and determines that a reset packet is transmitted to a server and a terminal that establish the communication connection, the traffic control unit transmits the reset packet to the server and the terminal according to the determination by the priority-degree determining unit, wherein, when an establishment request packet for a communication connection is further received from a server or a terminal that establishes the communication connection having the low priority degree, the priority-degree determining unit changes the policy information to discard the establishment request packet, and wherein, when the communication quality of the communication connection having the predetermined priority degree is larger than the low priority degree disconnection threshold, the priority-degree determining unit resets the changed policy information to a state before the change.

2. The radio communication apparatus according to claim 1, wherein when a downlink packet transmitted from the server to the terminal is received, the traffic monitoring unit detects a sequence number from the header information, and the priority-degree determining unit sets, as the communication quality, a traffic amount calculated from the number of detections per unit time of the sequence number.

3. The radio communication apparatus according to claim 2, wherein when an uplink packet transmitted from the terminal to the server is received, the traffic monitoring unit detects a sequence number from the header information, and the priority-degree determining unit sets, as the communication quality, a TCP retransmission request ratio calculated from the number of detections per unit time of the sequence number.

4. The radio communication apparatus according to claim 2, wherein the priority-degree determining unit determines that a keep-alive packet is transmitted to a server and a terminal that establish a communication connection in which a sequence number is not detected within a first period, when a response to the keep-alive packet is not received from both of the server and the terminal within a second period, the priority-degree determining unit deletes a record of the communication connection from the quality recording section and determines that a reset packet is transmitted to a server and a terminal that establish the communication connection, and the traffic control unit transmits, according to the determination by the priority-degree determining unit, the keep-alive packet and the reset packet to the server and the terminal.

5. The radio communication apparatus according to claim 1, wherein the low priority degree non-permission threshold and the low priority degree disconnection threshold are a same value.

6. A radio communication method for a radio communication apparatus mounted on a mobile body that establishes a local network using a plurality of terminals and configured to relay a packet transmitted and received between a predetermined terminal connected to the local network and a server connected to an external network, which is another network, the radio communication apparatus including a policy registering section that registers policy information indicating possibility of communication connection establishment for each combination of the server and the terminal and a priority degree of the communication connection and a quality recording section that records communication quality of an established communication connection, the radio communication method comprising:

a header extracting step of extracting header information from a packet received from the server or the terminal;

a priority degree determining step of determining, based on the extracted header information and the policy information registered in the policy registering section, whether relay processing for the received packet is performed; and a traffic control step of discarding the received packet when it is determined that the relay processing is not performed, wherein in the priority degree determining step, when communication quality of a communication connection having a predetermined priority degree is equal to or lower than a low priority degree non-permission threshold, which is a threshold for not permitting establishment of a communication connection having a priority degree lower than the predetermined priority degree, the policy information is set to discard an establishment request packet for a communication connection having a priority degree lower than the predetermined priority degree, when communication quality of a communication connection having a predetermined priority degree is equal to or lower than a low priority degree band limit threshold, which is a threshold for limiting a band of a communication connection having a priority degree lower than the predetermined priority degree, in the priority degree determining step, it is determined that the band of the communication connection having the priority degree lower than the predetermined priority degree is set smaller than a band of the communication connection having the predetermined priority degree, in the traffic control step, according to the determination in the priority degree determining step, the band of the communication connection having the priority degree lower than the predetermined priority degree is set smaller than the band of the communication connection having the predetermined priority degree and performs transmission of a packet, when communication quality of the communication connection having the predetermined priority degree is equal to or lower than a low priority degree disconnection threshold, which is a threshold for disconnecting the communication connection having the priority degree lower than the predetermined priority degree the lower priority degree disconnection threshold less than the low priority degree band limit threshold, in the priority degree determining step, a record of the communication connection having the low priority degree is deleted from the quality recording section and it is determined that a reset packet is transmitted to a server and a terminal that establish the communication connection, in the traffic control step, the reset packet is transmitted to the server and the terminal according to the determination in the priority degree determining step, when an establishment request packet for a communication connection is further received from a server or a terminal that establishes the communication connection having the low priority degree, in the priority degree determining step, the policy information is changed to discard the establishment request packet, and when the communication quality of the communication connection having the predetermined priority degree is larger than the low priority degree disconnection threshold, in the priority degree determining step, the changed policy information is reset to a state before the change.

7. The radio communication method according to claim 6, wherein when a downlink packet transmitted from the server to the terminal is received, in the header extracting step, a sequence number is detected from the header information, and in the priority degree determining step, a traffic amount calculated from the number of detections per unit time of the sequence number is set as the communication quality.

8. The radio communication method according to claim 7, wherein when an uplink packet transmitted from the terminal to the server is received, in the header extracting step, a sequence number is detected from the header information, and in the priority degree determining step, a TCP retransmission request ratio calculated from the number of detections per unit time of the sequence number is set as the communication quality.

9. The radio communication method according to claim 7, wherein in the priority degree determining step, it is determined that a keep-alive packet is transmitted to a server and a terminal that establish a communication connection in which a sequence number is not detected within a first period, when a response to the keep-alive packet is not received from both of the server and the terminal within a second period, a record of the communication connection is deleted from the quality recording section and it is determined that a reset packet is transmitted to a server and a terminal that establish the communication connection, and in the traffic control step, the keep-alive packet and the reset packet are transmitted to the server and the terminal according to the determination in the priority degree determining step.

10. The radio communication method according to claim 6, wherein the low priority degree non-permission threshold and the low priority degree disconnection threshold are a same value.

\* \* \* \* \*